Nov. 8, 1927.
T. E. MURRAY
1,648,026
FLANGED COUPLING
Filed Jan. 31, 1923
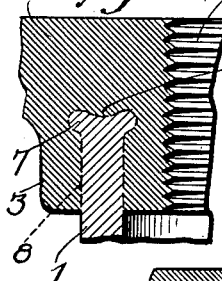
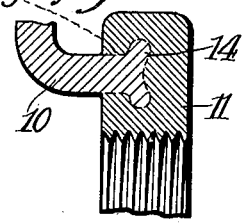
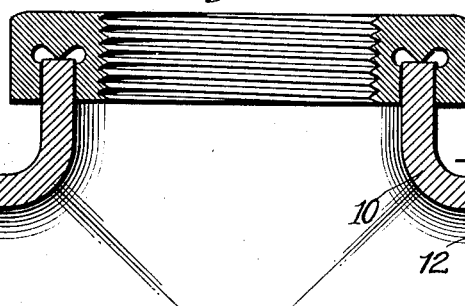
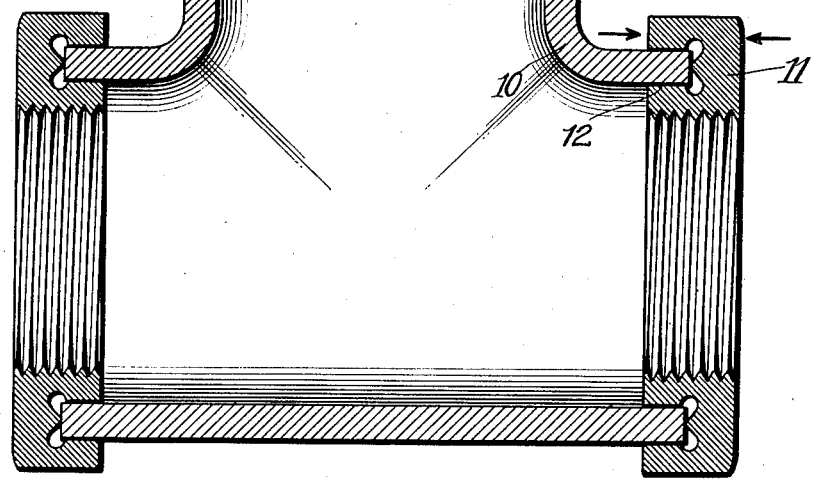
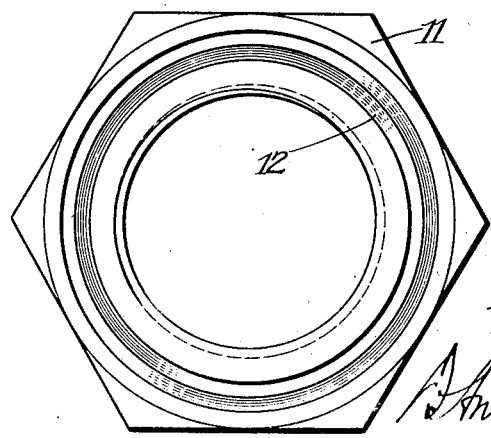
INVENTOR
Thomas E. Murray
BY
Anthony Ursid ATTORNEY Patented Nov. 8, 1927.

1,648,026

UNITED STATES PATENT OFFICE.

THOMAS E. MURRAY, OF BROOKLYN, NEW YORK.

FLANGED COUPLING.

Application filed January 31, 1923. Serial No. 616,032.

My invention aims to provide an improved method of applying flanges on the ends of tubular articles such as pipes, couplings and the like. The method is applicable also to various analogous problems. The invention includes the product also.

The accompanying drawings illustrate embodiments of the invention.

Figs. 1 and 2 illustrate in longitudinal section the method of applying to the end of a steel pipe a brass head or flange with an internal thread;

Figs. 3 and 4 are similar sections illustrating the application of flanges to the ends of a tubular T;

Fig. 5 is an inside face elevation of one of the brass members applied in Fig. 3.

Referring to Figs. 1 and 2, 1 is the end of a steel pipe or other tubular article on the end of which a flange is to be applied. A flange member 2 is provided of the desired shape with a hub 3 formed with an annular groove 4 in which the end of the tube 1 fits loosely. At the bottom of the groove 4 it is undercut preferably on both sides to form recesses 5 between which is a central projection 6.

The parts 1 and 2 are clamped in electrodes and pressed toward each other in the manner shown by the arrows. A current is then passed through the work and the parts are softened along their adjacent points to a plastic or welding consistency.

The softened end of the tubular member 1 is deflected by the undercut character of the recess in the member 2 and the steel is welded and spread laterally somewhat in the manner shown in Fig. 2 to form lateral ears or projections 7 which also mechanically bond or lock the two parts together. At the same time the parts are welded to each other to some extent along the contacting surfaces indicated roughly by the dotted line 8.

The member 2 is formed with internal threads 9 either before or after application of the end of the tube 1. In fact the member 2, instead of being a threaded flange as shown, may be of various other shapes and may serve various other functions than that of a coupling flange on the end of a pipe. Also, though the invention is particularly useful in providing brass or other non-corrodible end pieces on tubular articles, yet it may be employed in uniting articles of the same metal and of a variety of shapes and uses.

In Fig. 3 I have shown the application of certain brass flanges to the three tubular ends of a T, the flanges being polygonal in outline for engagement by a wrench and being threaded for convenient attachment to pipes, couplings or the like. The T 10 is of steel or iron and the nuts 11 are provided with sockets 12 into which the ends of the part 10 fit freely; these sockets being shaped similarly to those of Fig. 1 so that when the parts are pressed together and a current passed through them they will be united as shown in Fig. 4, welded to the desired extent along the line 13 and with projecting parts 14 locking or bonding the nuts to the ends of the T.

The preferred method of welding the parts together is that described in the Murray reissue Patent No. 15,466 of October 10, 1922, in which a current of extremely high ampere strength is applied for a very brief regulated period of time; this process being particularly useful for uniting two different metals, as explained in said reissue patent. The welding operation is controlled as to current density and time and the other steps of the welding operation are regulated, so that the extent of the welding can be controlled. That is, there may be only a weak weld analogous to a merely sticking together of the parts or there may be a strong weld with substantial interpenetration of the parts.

Likewise the pressure with which the parts are forced together may vary for different cases according to the desired take-up and character of the joint. Where one of the parts is of copper or brass or other brazing material the mere passing of the current will effect a union without substantial pressure of the parts together. And I may introduce a brazing material such as copper at the base of the recess or elsewhere between the two parts. The raised projection 13, by making a smaller area of contact at the point where the chief current passes, increases the density of the current and concentrates the heat at the bottom of the recess. It is advantageous to make the groove 4 of substantial depth, a depth equal to at least the thickness of the part 1 introduced therein. The joint obtains considerable strength from the flanges which constitute the opposite walls of this groove. Hence the making of the depth of the groove, or the width of such flanges, of substantial length serves to stiffen and strengthen the joint. The undercut construction may be applied before the weld not only to one of the parts to be joined as illustrated, but to both such parts in order to produce a double mechanical lock. In fact, the shapes of the parts may be varied in a great many ways to take advantage of the principle of the invention. It will be understood also that the recess in one part, into which the other part is introduced, is not necessarily a simple straight recess with two side walls embracing the second part, but may be of various shapes and proportions.

The weld, however, is better if one part be shaped to embrace the other at least sufficiently to protect the welding areas to a substantial extent from the atmosphere. By the protection of such parts from the atmosphere the oxidation and burning effect is less than if the joint surfaces were exposed in the open air.

The product, as an article of manufacture, is particularly useful because of the combined mechanical and welded joint. The mechanical interlock saves strain on the weld, while the welding of the parts makes a joint which cannot leak.

Though I have described with great particularity of detail certain embodiments of my invention, yet it is not to be understood therefrom that the invention is restricted to the particular embodiment disclosed. Various modifications thereof may be made by those skilled in the art without departure from the invention as defined in the following claims.

What I claim is:—

1. A tubular flanged article of manufacture comprising a tubular body and a separately formed flange member, said tubular body having an end entering an annular recess in the flange member, which recess has parallel sides embracing the end of the tubular member and holding it against lateral movement and has an undercut bottom portion, the tubular member being expanded at the end to enter the undercut portion of the recess and the parts being welded together.

2. The tubular flanged article of manufacture of claim 1, the body being of ferrous metal and the flange member being of comparatively non-corrodible metal.

In witness whereof, I have hereunto signed my name.

THOMAS E. MURRAY.